(12) United States Patent
Nishimiya

(10) Patent No.: US 10,864,579 B2
(45) Date of Patent: Dec. 15, 2020

(54) CHUCK

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Fuchu (JP)

( * ) Notice: Subject to any disclaimer, the term of this patent is extended or adjusted under 35 U.S.C. 154(b) by 0 days.

(21) Appl. No.: 16/633,561

(22) PCT Filed: Feb. 8, 2018

(86) PCT No.: PCT/JP2018/004476
§ 371 (c)(1),
(2) Date: Jan. 23, 2020

(87) PCT Pub. No.: WO2019/021513
PCT Pub. Date: Jan. 31, 2019

(65) Prior Publication Data
US 2020/0215622 A1    Jul. 9, 2020

(30) Foreign Application Priority Data
Jul. 24, 2017 (JP) .................................. 2017-143019

(51) Int. Cl.
*B23B 31/16* (2006.01)
(52) U.S. Cl.
CPC ........ *B23B 31/16279* (2013.01); *B23B 31/16* (2013.01); *Y10T 279/1986* (2015.01)

(58) Field of Classification Search
CPC ............... B23B 31/16; B23B 31/16279; Y10T 279/1986
See application file for complete search history.

(56) References Cited

U.S. PATENT DOCUMENTS

| | | | | |
|---|---|---|---|---|
| 2,667,358 A * | 1/1954 | Highberg | .......... | B23B 31/16279 279/123 |
| 3,219,356 A * | 11/1965 | Wilterdink | ........ | B23B 31/16208 279/123 |
| 4,434,990 A * | 3/1984 | Kobayashi | .......... | B23B 31/1605 279/123 |
| 5,076,596 A * | 12/1991 | Jaggers | ............. | B23B 31/16279 279/123 |
| 6,089,578 A * | 7/2000 | Chai | ........................ | B23B 31/32 279/123 |
| 6,491,305 B2 * | 12/2002 | Sida | .................. | B23B 31/16279 279/124 |
| 10,016,816 B2 * | 7/2018 | Kim | ........................ | B23B 31/16 |

(Continued)

FOREIGN PATENT DOCUMENTS

EP    0512230 A2 * 11/1992 ....... B23B 31/16279
JP    2009012155 A * 1/2009

(Continued)

*Primary Examiner* — Eric A. Gates
(74) *Attorney, Agent, or Firm* — Maschoff Brennan

(57) ABSTRACT

Each jaw includes a master jaw with serrations and a top jaw, with serrations, to be fastened to a T-nut. The support groove includes a first keyway into which the key is fitted, whereas the top jaw includes a second keyway into which a tip of the key is fitted. A gap exists between the key and each of the first keyway and the second keyway. The key is inclined or twisted with respect to both the first keyway and the second keyway.

20 Claims, 14 Drawing Sheets

(56) References Cited

U.S. PATENT DOCUMENTS

| | | | |
|---|---|---|---|
| 10,688,567 B2 * | 6/2020 | Nishimiya | .............. B23B 31/16 |
| 2011/0277602 A1 * | 11/2011 | Kobayasi | .......... B23B 31/16279 |
| | | | 82/117 |

FOREIGN PATENT DOCUMENTS

| | | | |
|---|---|---|---|
| JP | 2014-155992 A | 8/2014 | |
| JP | 2017-217752 A | 12/2017 | |
| WO | WO-2010013877 A1 * | 2/2010 | ....... B23B 31/16254 |
| WO | WO-2019107142 A1 * | 6/2019 | ....... B23B 31/16237 |

* cited by examiner

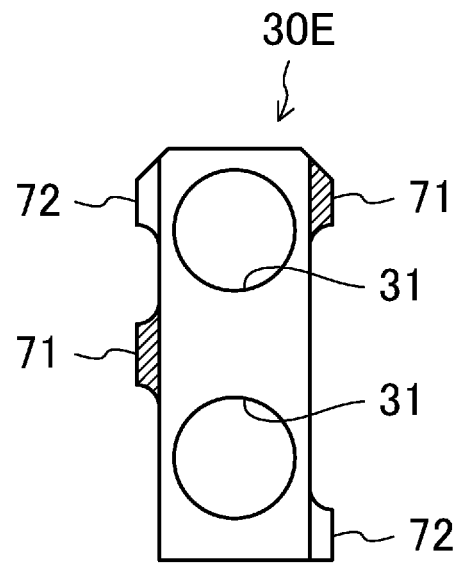
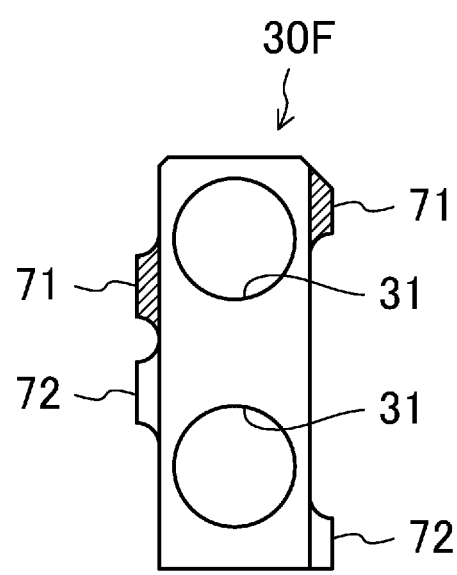

CHUCK

TECHNICAL FIELD

The present invention relates to a chuck that supports a workpiece in mechanical processing using a lathe, for example, and particularly to a technique of maintaining a high centering accuracy even after attaching/detaching a top jaw after centering.

BACKGROUND ART

In mechanical processing such as cutting while rotating a workpiece using a lathe, for example, there is a need to firmly support the workpiece with the workpiece centered at a high accuracy (i.e., in a manner in which the center of the workpiece agrees with the rotation axis in the processing). As a tool for supporting such a workpiece, a chuck is generally used.

In order to support the workpiece, a plurality of jaws that slide radially are radiatingly arranged in front of the chuck. Each jaw includes a master jaw and a top jaw. The master jaw is located in a body of the chuck and slides radially. The top jaw is detachably attached to the master jaw with bolts, for example, to support the workpiece.

The master jaw and the top jaw have, on their contact surfaces in close contact with each other, serrations (i.e., continuous unevenness with a serrated cross section) extending circumferentially. Such serrations mesh and come into close contact with each other to firmly fix the top jaw to the master jaw with the top jaw positioned radially with respect to the master jaw with a high accuracy, when the top jaw is attached to the master jaw.

The top jaw may be however attached/detached after centering. Once the top jaw is detached from the master jaw, the top jaw may be displaced, although slightly, circumferentially with respect to the master jaw along the serrations. When such off-centering occurs (i.e., when the center of the workpiece fails to agree with the rotation axis in the processing), a further centering operation is needed, which requires a lot of work and high skills.

Patent Document 1 is one of conventional art that aims to solve such the problem.

In order to reduce circumferential displacement caused by the tolerance between a bolt and a bolt hole, Patent Document 1 provides the following configuration. A master jaw has, on its contact surface with serrations, a rail extending and protruding in a direction different from the circumferential direction. On the other hand, a top jaw has, on its contact surface with serrations, a rail groove into which the rail is fitted.

With this configuration, the serrations of both the jaws as well as the rail and the rail groove mesh with each other to fix the top jaw to the master jaw with the top jaw positioned also circumferentially with respect to the master jaw, when the top jaw is attached to the master jaw.

CITATION LIST

Patent Document

Patent Document 1: Japanese Unexamined Patent Publication No. 2014-155992

SUMMARY OF THE INVENTION

Technical Problem

The method of Patent Document 1 maintains a high centering accuracy even after attaching/detaching the top jaw after centering. The top jaw may be however displaced circumferentially with respect to the master jaw for causes other than the tolerance between a bolt and a bolt hole, which are to be addressed.

This point will be described with reference to FIG. 1. A top jaw 100 is attached to a master jaw 101 via a T-nut 102. The T-nut 102 is a prism member with a substantially T-shaped cross section and includes a wide base and a narrow leg. A contact surface 101a of the master jaw 101 has a longitudinally extending keyway 103 with a substantially inverted T-shaped cross section. That is, the keyway 103 includes a wide region and a narrow region. The T-nut 102 is inserted into this keyway 103 with the tip of the leg protruding from the contact surface 101a.

On the other hand, a contact surface 100a of the top jaw 100 has a longitudinally extending fitting groove 104 with a rectangular cross section. The tip of the leg is fitted into this fitting groove 104. Accordingly, the leg of the T-nut 102 is fitted in both the narrow region and the fitting groove to unrotatably position the top jaw 100 with respect to the master jaw 101.

Gaps s are present between the leg and the narrow region to insert the T-nut 102 into the master jaw 101 and between the leg and the fitting groove to fit the top jaw 100 into the leg.

Accordingly, both types of the gap s also circumferentially displace the top jaw 100 with respect to the master jaw 101. For example, as indicated by a white arrow in FIG. 1, the total gap S (displacement) of both the types of the gap s is generated at the maximum, which is non-negligible even if the individual gaps s are small.

In addition, in the method of Patent Document 1, since the rail and the rail groove extend in a different direction from the serrations, even a displacement at a slight angle may be problematic. There is thus a need to form the rail and the rail groove with an extremely high accuracy, which causes disadvantages such as a complex structure and a larger number of manufacturing steps.

It is an objective of the present invention to provide a chuck, with a simple structure, capable of maintaining a high centering accuracy even after attaching/detaching a top jaw after centering.

Solution to the Problem

The present invention relates to a chuck including a plurality of jaws in front of a chuck body. The jaws slide radially to support a workpiece so that a center of the workpiece agrees with a rotation axis.

Each of the jaws includes: a master jaw assembled to the chuck body and having, in front of the chuck body, a contacted surface with serrations extending circumferentially; a connecting member being inserted into a support groove that is formed in the contacted surface to extend radially and being incapable of coming out along the rotation axis; and a top jaw having a contact surface with serrations, fastened to the connecting member along the rotation axis to come into close contact with the contacted surface, and being detachably attached to the master jaw to support the workpiece.

The connecting member includes: a stopper extending along the support groove; and a key extending, with a width smaller than that of the stopper, in accordance with the stopper. The support groove includes: a first keyway into which the key is fitted with a tip of the key protruding from the contacted surface; and a stopper retainer configured to hold the stopper. The top jaw includes, on the contact surface, a second keyway into which the tip of the key is fitted.

A gap exists between the key and each of the first keyway and the second keyway. A close contact between the contact surface and the contacted surface inclines or twists the key with respect to both the first keyway and the second keyway.

That is, this chuck has the same or similar basic structure to conventional art. Specifically, the top jaw is fastened to the connecting member, which is inserted into the support groove in the contacted surface of the master jaw, along the rotation axis in a state in which the connecting member is incapable of coming out along the rotation axis, thereby being fixed to the master jaw. The master jaw assembled to the chuck body has, on the contacted surface, the serrations extending circumferentially. The top jaw also has the serrations on its contact surface.

Accordingly, a close contact between the contact surface and the contacted surface fixes the top jaw with the top jaw radially positioned by the serrations with a high accuracy.

In the case of this chuck, the structures of the master jaw, the connecting member, and the top jaw constituting the jaw have been modified, unlike conventional art. Specifically, a close contact between the contact surface and the contacted surface inclines or twists the key with respect to both the first keyway and the second keyway. In other words, the chuck is configured such that the close contact rotates the key from the first and second keyways in an opposite direction.

An inclination of the key with respect to both the first keyway and the second keyway reduces the gap existing between the key and each of the first keyway and the second keyway. Accordingly, the space decreases which causes circumferential displacement of the top jaw with respect to the master jaw. This maintains a high centering accuracy even after attaching/detaching the top jaw after centering. Partial modification of the jaw may suffice without requiring any complex and high-cost modification. The present invention is achievable by simply modifying the structure of conventional art as a basis.

The chuck may also be configured such that the close contact between the contact surface and the contacted surface inclines or twists the key with respect to both the first keyway and the second keyway to come into contact with the first keyway and the second keyway.

If the top jaw is made of a soft material more deformable than the connecting member, the chuck may also be configured such that the close contact between the contact surface and the contacted surface twists and allows the key to bite into the second keyway.

The chuck may also be configured such that at least one of the first keyway and the second keyway extends inclined with respect to the associated serrations.

The chuck may also be configured as follows. The key includes: a first key to be fitted into the first keyway; and a second key to be fitted into the second keyway. The first key and the second key extend inclined with respect to each other.

The chuck may also be configured as follows. The key includes: a first key to be fitted into the first keyway; and a second key to be fitted into the second keyway. The first key has, on its sides extending longitudinally, a pair of first protrusions protruding from different longitudinal positions in opposite directions. The second key has, on its sides extending longitudinally, a pair of second protrusions protruding from different longitudinal positions in opposite directions. A width of the first key including one of the first protrusions is smaller than the first keyway, and a maximum width of the first key including both the first protrusions is larger than the first keyway. A width of the second key including one of the second protrusions is smaller than the second keyway, and a maximum width of the second key including both the second protrusions is larger than the second keyway.

The chuck may be configured such that each of the pair of the second protrusions protrudes transversely from one pair of diagonally opposing corners at both of the longitudinal ends of the second key.

The chuck may also be configured such that each of the pair of the first protrusions protrudes from one longitudinal end of the first key in a direction opposite to corresponding one of the second protrusions.

The chuck may also be configured such that one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

Advantages of the Invention

The chuck according to the present invention has a simple configuration but maintains a high centering accuracy even when a top jaw is attached/detached after centering.

BRIEF DESCRIPTION OF THE DRAWINGS

FIG. 11C is a schematic view illustrating yet another variation of the second modified T-nut.

FIG. 11D is a schematic view illustrating still another variation of the second modified T-nut.

DESCRIPTION OF EMBODIMENTS

Embodiments of the present invention will now be described in detail with reference to the drawings. The following description of preferred embodiments is however only an example in nature and is not intended to limit the scope, applications, or use of the present invention.

<Basic Configuration of Chuck>

Figure 1:
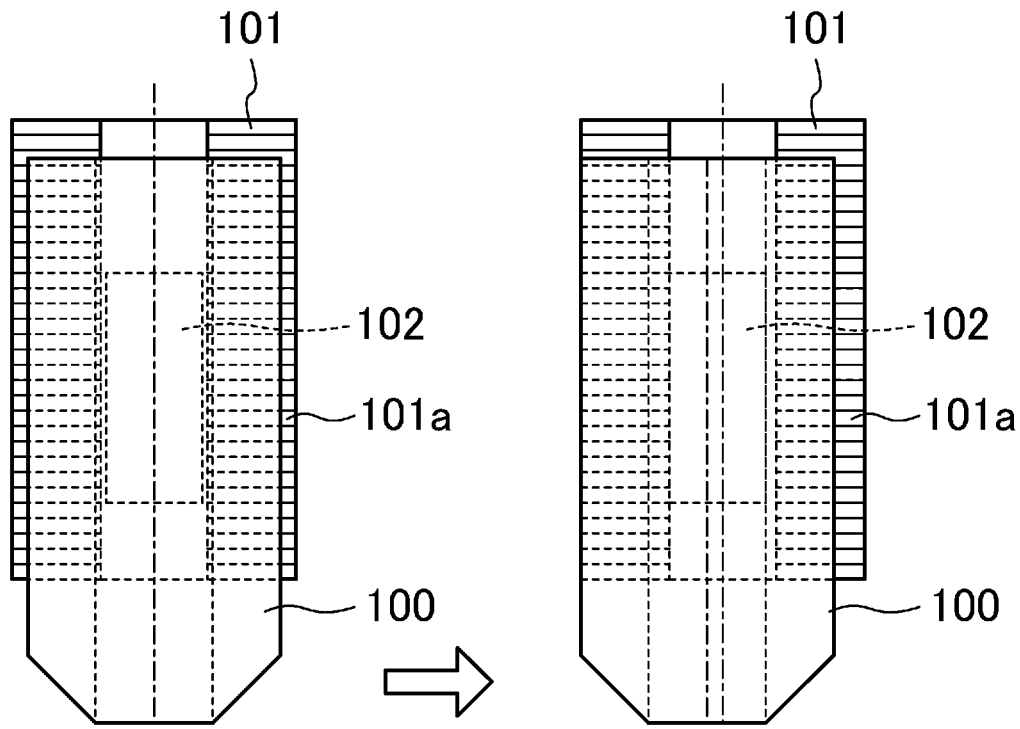
FIG. 1 is a view illustrating a cause of circumferential displacement of a top jaw with respect to a master jaw.
Figure 1:
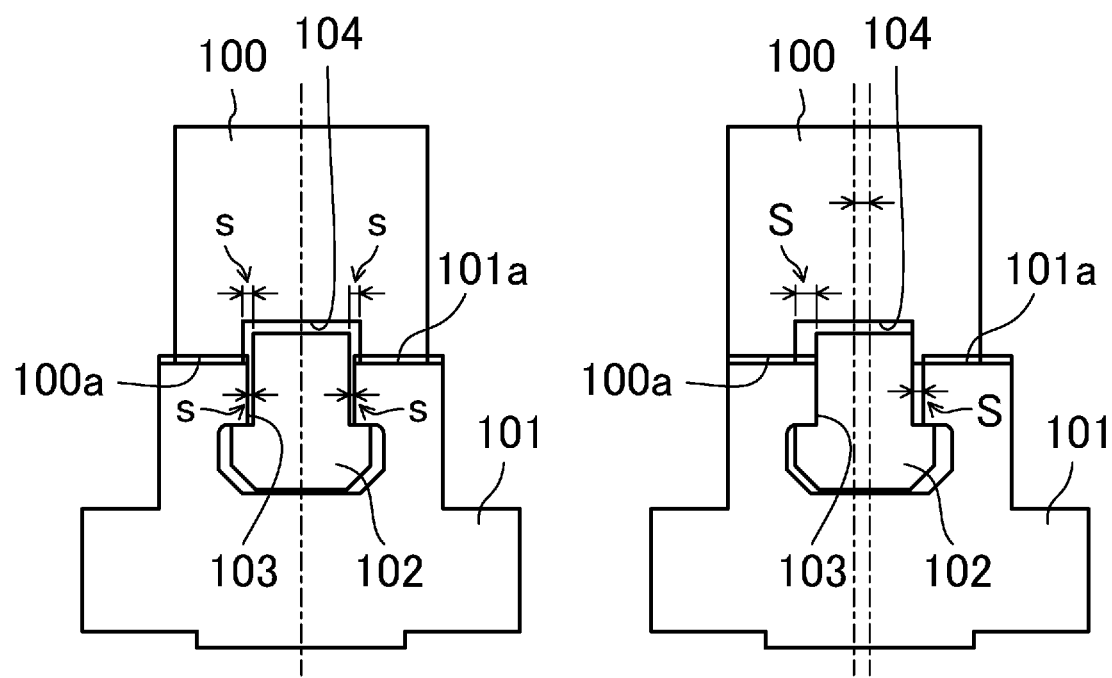
Figure 2:
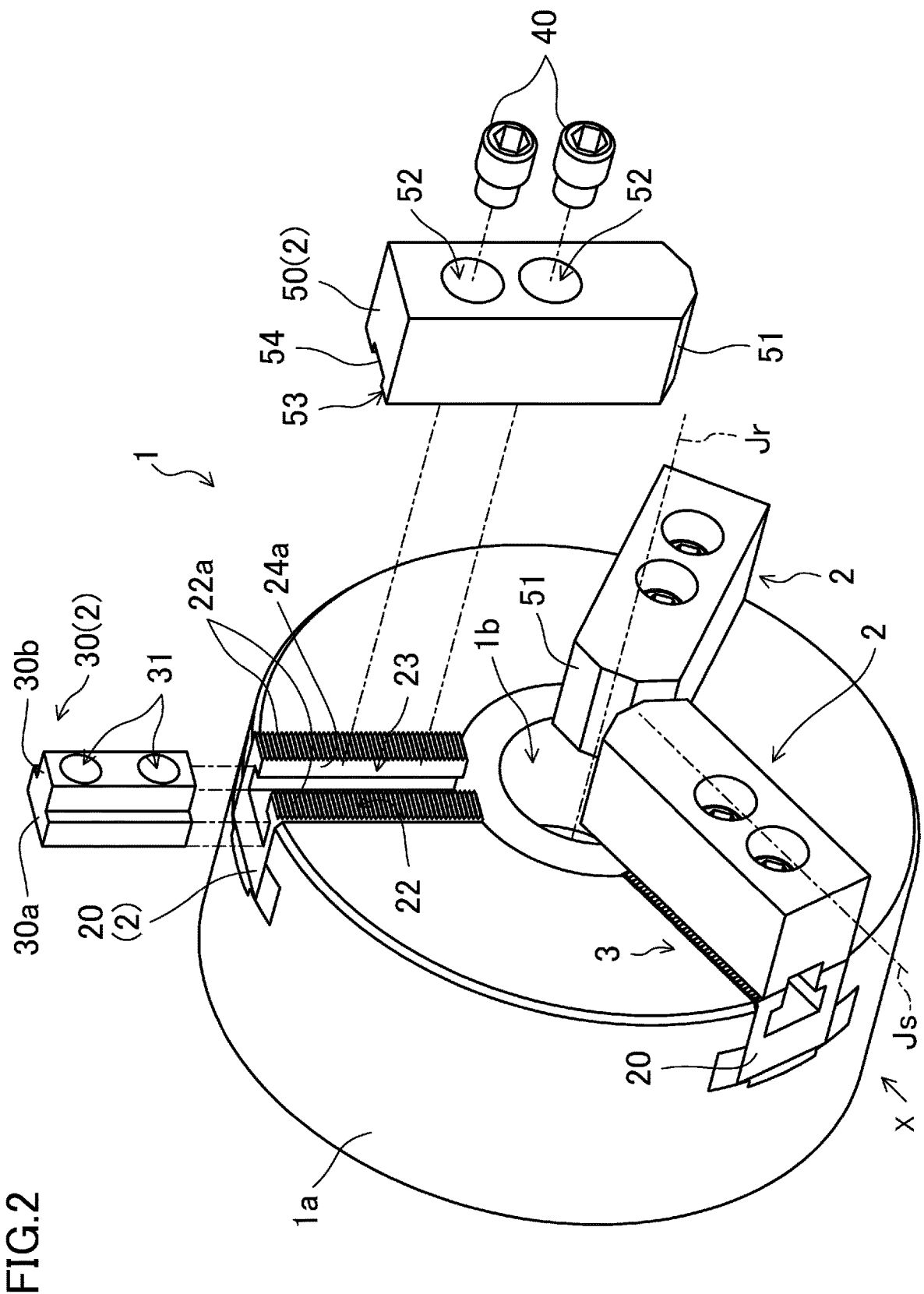
FIG. 2 is a schematic view illustrating a chuck according to an embodiment.

FIG. 2 exemplarily illustrates a chuck 1 to which the present invention is applied. As shown in FIG. 2, the chuck 1 includes a chuck body 1a with a thick, disk-like appearance. The chuck body 1a is used with its rear fixed to a machine tool such as a lathe so that the front of the chuck body is orthogonal to a rotation axis Jr. In accordance with the above orientation, for example, the terms "front," "rear," "along the rotation axis" (i.e., in the direction in which the rotation axis Jr extends), "circumferential" direction (i.e., the direction in which the rotation axis Jr rotates), and "radial" direction (i.e., the direction in which the radius of the chuck body extends from the rotation axis Jr) are used as appropriate to indicate the directions in the following description.

The front of the chuck body 1a is a flat surface with a circular opening 1b at its center. In front of the chuck body 1a, a plurality of (e.g., at least two or more, three in this embodiment) jaws 2 that support a workpiece are radiatingly arranged at equal intervals.

In the case of the chuck 1 of this embodiment, each jaw 2 slides radially inward along a slide axis Js extending radially, when, for example, the lathe performs processing. With this configuration, the workpiece located at the center of the front of the chuck body 1a is firmly grasped by workpiece supports 51. After centering is performed so that the center of the workpiece agrees with the rotation axis Jr, the rotating workpiece is subjected to processing such as cutting.

Each jaw 2 includes a master jaw 20, a T-nut 30 (i.e., an example of a connecting member), and a top jaw 50. The master jaw 20 is radially slidably assembled to the chuck body 1a. The T-nut 30 is inserted into the master jaw 20. The top jaw 50 is detachably attached to the master jaw 20 via the T-nut 30 by fastening with bolts 40.

(Master Jaw 20)

Three slide grooves 3 are radiatingly formed at equal intervals in the front surface of the chuck body 1a to extend radially outward from the circumference of the opening 1b. Each master jaw 20 is, as a component constituting the chuck body 1a, assembled to associated one of the slide grooves 3.

Figure 3:
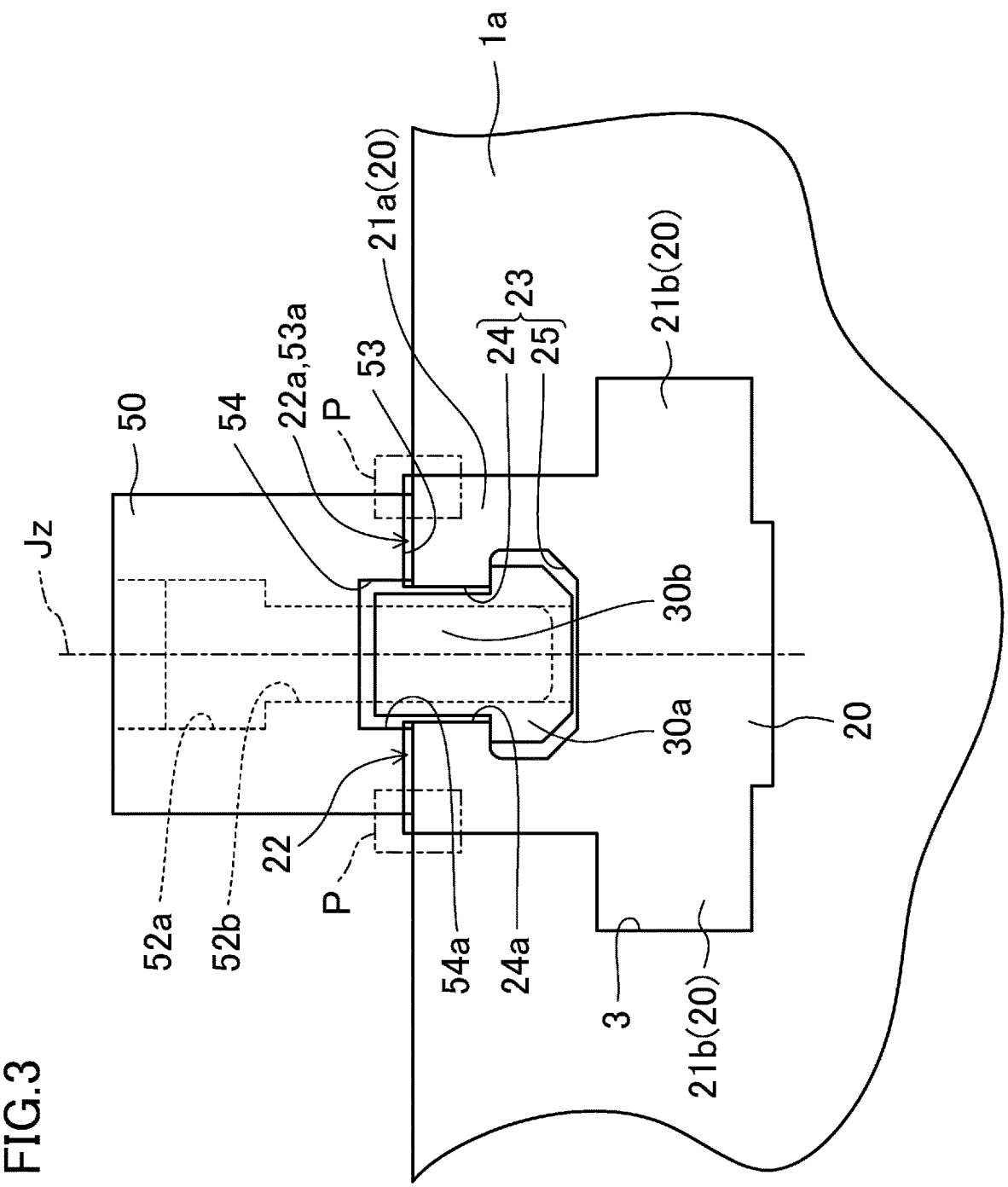
FIG. 3 is a schematic view illustrating a main part of the chuck of FIG. 2 as viewed along the arrow X.

As shown in FIG. 3 as well, each master jaw 20 is a hard metal member having a substantially T-shaped transverse section and including a base 21a in the shape of a prism and a pair of flanges 21b and 21b. The base 21a has an elongated rectangular contacted surface 22 at the front. The flanges 21b and 21b protrude from the rear surface of the base 21a to two sides. Each slide groove 3 has a substantially inversed T-shaped transverse section corresponding to the associated one of the master jaws 20. Each master jaw 20 is fitted into the associated one of the slide grooves 3 to extend radially with the contacted surface 22 exposed from the front of the chuck body 1a.

Although not shown, a plunger that slides along the rotation axis is built in the chuck body 1a. In conjunction with the slide of the plunger, each master jaw 20 slides radially along the slide axis Js. Being assembled to the chuck body 1a, the master jaw 20 is designed to slide radially but hardly move circumferentially.

The contacted surface 22 is a flat surface orthogonal to an axis (also referred to as a "jaw's center axis Jz") that is parallel to the rotation axis Jr. The contacted surface 22 has serrations 22a. The serrations 22a are a known serrated meshing structure composed of a group of linear projections and linear recesses each of which has a continuous, substantially triangular raised or recessed transverse section. The contacted surface 22 has the serrations 22a extending circumferentially in parallel to the width (i.e., the shorter side) of the contacted surface 22.

A support groove 23 is formed at a transverse center of the contacted surface 22. The support groove 23 has a substantially inversed T-shaped transverse section around the jaw's center axis Jz. The support groove 23 is formed in the base 21a of the master jaw 20 to extend radially along the slide shaft Js with the master jaw 20 located in the chuck body 1a. Accordingly, the contacted surface 22 is divided into two parts by the support groove 23 to form a pair of band-like regions of the serrations 22a at both sides of the support groove 23.

The support groove 23 includes a first keyway 24 and a stopper retainer 25. The first keyway 24 has a relatively small width that is open to the contacted surface 22. The stopper retainer 25 has a relatively great width that is continuous with the rear of the first keyway 24. The first keyway 24 has a pair of first inner contact surfaces 24a and 24a that are flat, and opposed and parallel to each other.

(T-Nut 30)

Each T-nut 30 is a hard metal prism member with a substantially T-shaped transverse section over the entire length. The width and length of the T-nuts 30 are smaller than those of the master jaws 20 and the top jaws 50. Each T-nut 30 has a stopper 30a and a key 30b in the shape of a rectangular parallelepiped. One end surface of the key 30b is continuous with the stopper 30a and extends, with a width smaller than the stopper 30a, in accordance with the stopper 30a. The other end surface of the key 30b has, at its apart ends, two fastening holes 31 and 31 extending along the jaw's center axis Jz.

The T-nut 30 is inserted to extend along the support groove 23 such that the T-nut 30 does not come out along the rotation axis (toward the front). Specifically, the transverse section of the T-nut 30 is relatively small to hold the stopper 30a in the stopper retainer 25 and the key 30b in the first keyway 24. The stopper 30a is held in the stopper retainer 25 with a sufficient space. The key 30b is held in the first keyway 24 to be fitted into the first keyway 24 with the tip of the key protruding from the contacted surface 22.

That is, the key 30b is fitted into the first keyway 24 to position the T-nut 30 with respect to the master jaw 20. In addition, the stopper 30a wider than the first keyway 24 is held in the stopper retainer 25 to restrict the T-nut 30 from coming out of the master jaw 20 along the rotation axis. There is a tiny "gap" between the key 30b and the first keyway 24, specifically between each first inner contact surface 24a and one of the side surfaces of the key 30b to allow insertion of the key 30b into the first keyway 24.

(Top Jaw 50)

Each top jaw 50 constitutes a part of the associated jaw 2 that supports the workpiece. The top jaw 50 may have various shapes in accordance with the shape, size, and other characteristics of the workpiece. The position in which the top jaw 50 supports the workpiece also depends on, for example, how to support the workpiece.

By contrast, the top jaw 50 of this embodiment is in the shape of a rectangular parallelepiped and has, at its end at the center of the chuck, a workpiece support 51 molded on a molding machine. The workpiece support 51 supports the workpiece. For example, a cylindrical workpiece may be supported from inside. In this case, the workpiece support 51 is located, for example, at a radially outer end of the top jaw 50.

The top jaw 50 may be of a hard or soft type. The hard type is made of a hard metal material subjected to hardening such as quenching like the master jaw 20 and the T-nut 30. The soft type (what is called a "soft jaw 2") is made of a metal material softer than the master jaw 20 and the T-nut 30.

At the front and rear of each top jaw 50, two bolt insertion holes 52 and 52 penetrating the top jaw 50 from the front to the rear and extending along the jaw's center axis Jz are formed in accordance with the arrangement of the fastening holes 31. Each bolt insertion hole 52 includes a head holder 52a at the front and a shaft holder 52b at the rear. The head holder 52a has a large diameter to hold the head of one of the bolts 40. The shaft holder 52b has a small diameter to hold the shaft of the bolt 40.

Figure 4:
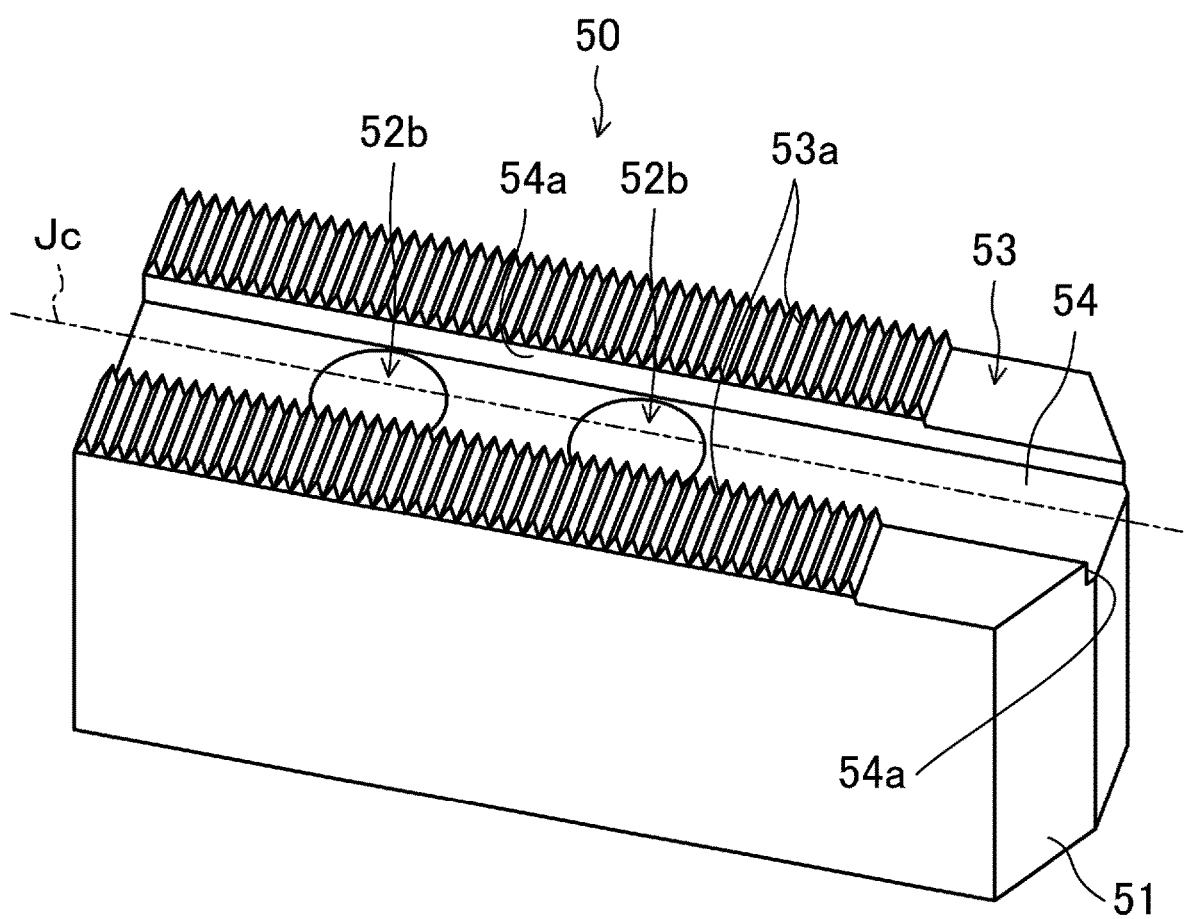
FIG. 4 is a schematic perspective view of the rear of the top jaw.

As shown in FIG. 4, the top jaw 50 has, at its rear, a contact surface 53 that is a flat surface with serrations 53a. The serrations 53a are formed parallel to the width (the shorter side) of the contact surface. The serrations 53a are orthogonal to the jaw's center axis Jz and the support's center axis Jc that extends radially and passes through the center of the workpiece support 51 (generally agrees with the slide axis Js). A band-like groove (i.e., a second keyway 54) with a rectangular transverse section is formed at a transverse center of the contact surface 53 so as to penetrate the top jaw 50 from one end to the other. In this embodiment, the second keyway 54 is designed to have the same width as the first keyway 24.

Accordingly, the contact surface 53 is divided into two parts by the second keyway 54. A pair of band-like regions of the serrations 53a are formed at both sides of the second keyway 54. The serrations 53a are formed to match the serrations 22a of the contacted surface 22 and are designed to mesh and come into close contact with the serrations 22a.

The second keyway 54 receives the tip of the key 30b fitted thereinto. The second keyway 54 has a pair of second inner contact surfaces 54a and 54a that are flat and opposed and parallel to each other. That is, the key 30b is fitted into the second keyway 54 to position the top jaw 50 with respect to the T-nut 30. There is a tiny "gap" between the tip of the key 30b and the second keyway 54, specifically between each second inner contact surface 54a and one of the side surfaces of the key 30b to allow insertion of the tip of the key 30b into the second keyway 54.

The shaft holder 52b is open in the bottom surface of the second keyway 54. The tip of the key 30b is fitted into the second keyway 54 and positioned so that the fastening holes 31 overlap the bolt insertion holes 52. Accordingly, through the fastening holes 31 and the bolt insertion holes 52, the two bolts 40 loosely fasten the top jaw 50 and the T-nut 30 together. In this state, the T-nut 30 is inserted into the support groove 23 from its periphery. The serrations 53a and 22a mesh with each other to locate the T-nut 30 and the support groove 23 in predetermined positions. The two bolts 40 are then fastened to the respective fastening holes 31.

With this configuration, the top jaw 50 is fixed to the master jaw 20 and the serrations 53a of the contact surface 53 mesh and come into close contact with the serrations 22a of the contacted surface 22. Since the serrations 22a extend circumferentially, the close contact between the contact surface 53 and the contacted surface 22 allows the serrations 22a and 53a to restrict the movement of the top jaw 50. There is no fear that the top jaw 50 may be misaligned radially with respect to the master jaw 20.

Moreover, the top jaw 50 can be firmly fixed to the master jaw 20 by fastening with the bolts 40. Therefore, once the top jaw 50 is fixed to the master jaw 20, the top jaw 50 can be supported while being not only radially but also circumferentially positioned with respect to the master jaw 20 with a high accuracy. Therefore, accurate centering leads to highly accurate processing of the workpiece.

The top jaw 50 may be, however, attached/detached after the centering due to change of the workpiece to be processed. Once the top jaw 50 is detached from the master jaw 20, the top jaw 50 may be displaced, although slightly, circumferentially with respect to the master jaw 20 along the serrations 22a.

That is, radial positioning is possible with the serrations 22a and 53a on a pitch-by-pitch basis. This allows arrangement of the contact surface 53 and the contacted surface 22 in the original positions without displacing the surfaces. However, the serrations 22a and 53a cannot restrict the circumferential movement. In addition, there are gaps between the key 30b and each of the first keyway 24 and the second keyway 54. The top jaw 50 is thus displaced with respect to the master jaw 20 within these gaps.

Since the positional displacement is slight at a level of several to tens μm, positioning by visual observation is also difficult. Once the positional displacement occurs, a further centering operation, which requires a lot of work and high skills, is thus needed to perform highly accurate processing. Note that the centering operation here is typically performed on the molding machine.

To address the problem, the chuck 1 includes the jaw 2 with a devised, simple structure to maintain a high centering accuracy even after attaching/detaching the top jaw 50 after centering. Specifically, each jaw 2 has a positioning mechanism that brings the contact surface 53 and the contacted surface 22 into close contact with each other to incline or twist the key 30b with respect (serves to rotate the key in the direction opposite) to both of the first and second keyways 24 and 54.

<Positioning Mechanism>

Figure 5:
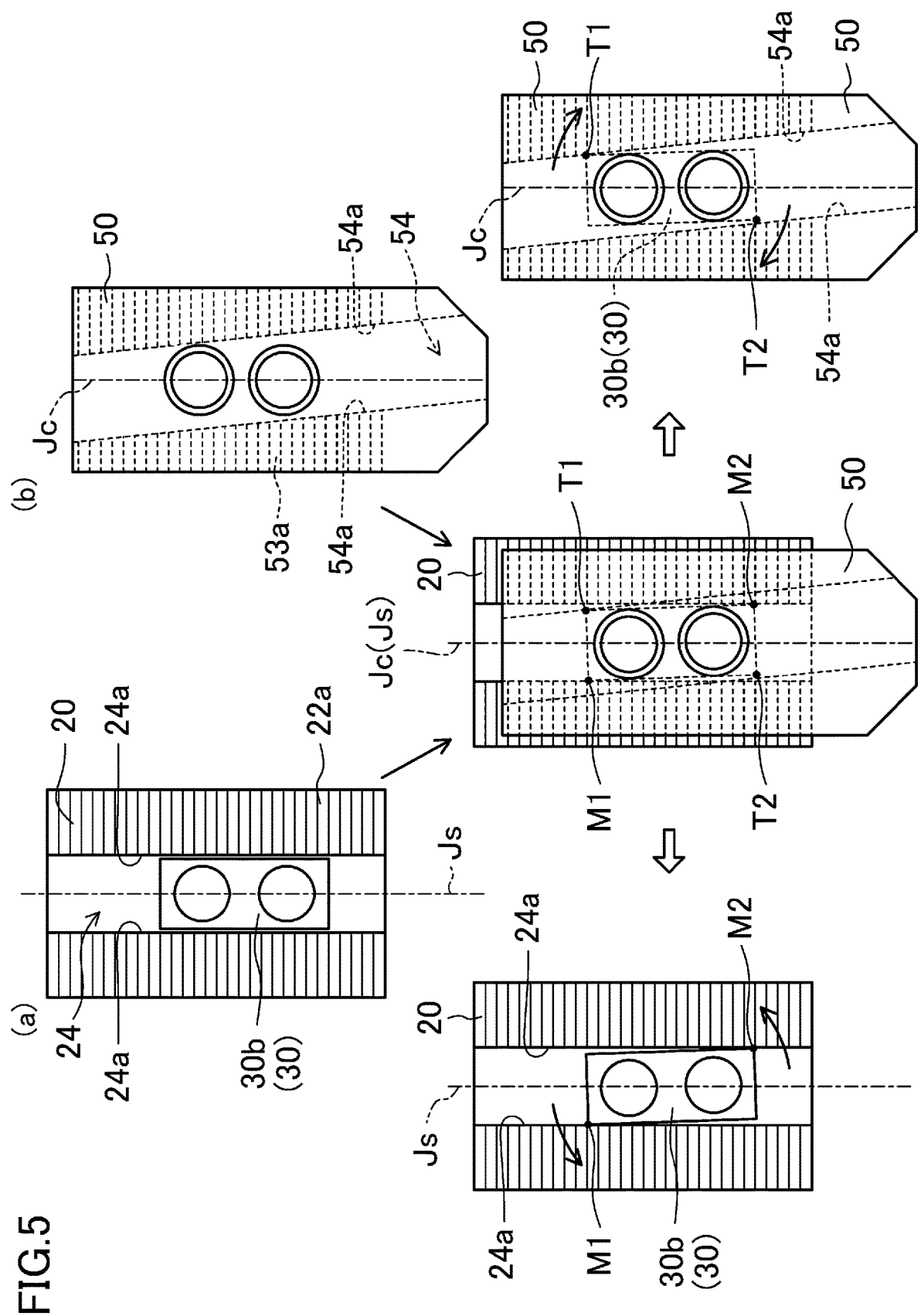
FIG. 5 is a view illustrating a positioning mechanism for the chuck.

The positioning mechanism according to this embodiment will be described with reference to FIG. 5. FIG. 5 schematically illustrates the process of attaching the top jaw 50 to the master jaw 20. In FIG. 5, the upper left illustration (a) is a front view of the master jaw 20 with the T-nut 30 attached, whereas the upper right illustration (b) is a front view of the top jaw 50.

The bottom center illustration is a front view of the master jaw 20 with the top jaw 50 attached. The left illustration illustrates the states of the master jaw 20 (i.e., the first keyway 24) and the T-nut 30 (i.e., the key 30b) at that time. The right illustration illustrates the states of the top jaw 50 (i.e., second keyway 54) and the T-nut 30 (i.e., the key 30b) at that time.

In general, the second keyway 54 of the top jaw 50 extend orthogonally to the serrations 53a. However, the second keyway 54 of this embodiment extend inclined with respect to the serrations 53a (an example of the positioning mechanism). The inclination is actually slight (e.g., 0.01° to 0.5°) with respect to the support's center axis Jc (i.e., the slide axis Js) (the inclination is here exaggerated for ease of understanding).

When the top jaw 50 is fixed to the master jaw 20, the contact surface 53 and the contacted surface 22 come into close contact with each other. The serrations 22a and 53a then mesh with each other. Accordingly, the top jaw 50 is parallel to the master jaw 20, and their transverse centers agree with each other (i.e., the slide axis Js and the support's center axis Jc agree with each other). At this time, since the second keyway 54 is inclined with respect to the key 30b, one pair of diagonally opposing corners T1 and T2 of the key 30b come into contact with the second inner contact surfaces 54a. In reaction, the key 30b (i.e., the T-nut 30) rotates so that the other pair of diagonally opposing corners M1 and M2 of the key 30b come closer to the first inner contact surfaces 24a.

That is, the meshing between the serrations 22a and 53a allows the key 30b to rotate with respect to both the first and second keyways 24 and 54 to be relatively inclined. This leads to decrease in the size of the substantial gap (i.e., the gaps allowing circumferential shift and movement) between the key 30b and each of the first keyway 24 and the second keyway 54. This reduces the amount of circumferential displacement and improves the positioning accuracy at reattachment of the top jaw 50.

When the key 30b rotates largely, the other pair of diagonally opposing corners of the key 30b come into contact with the first inner contact surfaces 24a to leave no substantial gap between the key 30b and each of the first keyway 24 and the second keyway 54 (the state shown in FIG. 5). When rotating further, the key 30b is pressed by both of the first keyway 24 and the second keyway 54 to be twisted (i.e., a twisting force is applied). In this manner, the key 30b is inclined to come into contact with or twisted with respect to both the first and second keyways 24 and 54. This configuration eliminates the circumferential displacement and improves the positioning accuracy at reattachment of the top jaw 50.

If the top jaw 50 is of the soft type, the key 30b may rotate largely to bite into the second keyway 54. Two parts of the second inner contact surfaces 54a are plastically deformed to form the bites. These bites guide the key 30b to an appropriate position at reattachment of the top jaw 50. This further improves the positioning accuracy further improves at reattachment of the top jaw 50.

As described above, if the second keyway 54 is inclined with respect to the serrations 22a and 53a, only the consumable top jaw 50 may be modified and conventional art may be used for the non-consumable master jaw 20 and T-nut 30. It is therefore advantageous in terms of costs.

The second keyway 54 may be as conventional and only the first keyway 24 may be inclined with respect to the serrations 22a. This case is advantageous in that conventional art may be used for the top jaw 50. Alternatively, both the first and second keyways 24 and 54 may be inclined with respect to the serrations 22a and 53a, respectively. In short, there is only a need to arrange the serrations 53a of the contact surface 53 in parallel to the serrations 22a of the contacted surface 22. If the need is satisfied, the first and second keyways 24 and 54 may be inclined in opposite directions.

Another Embodiment of Positioning Mechanism

Figure 6:
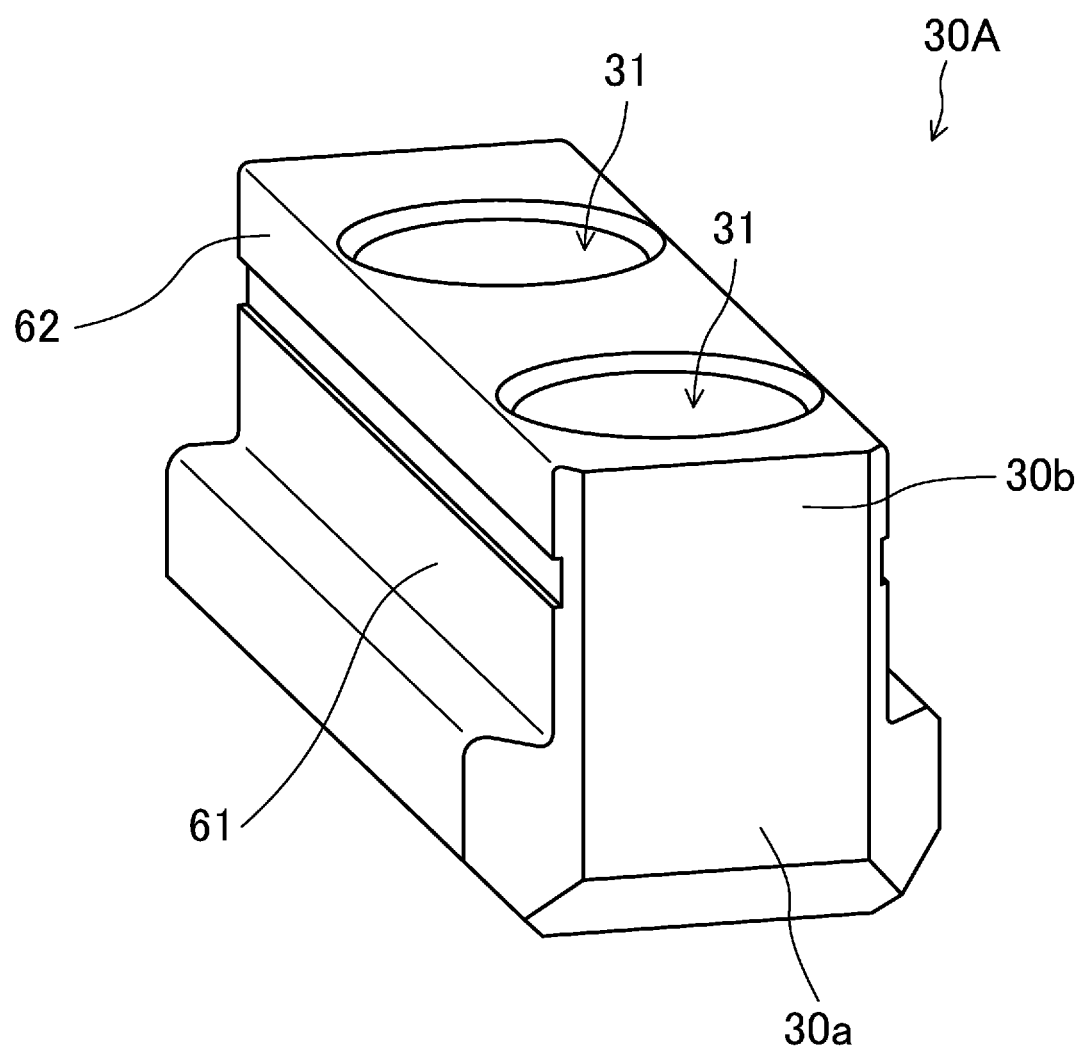
FIG. 6 is a schematic perspective view of a modified T-nut.
Figure 7:
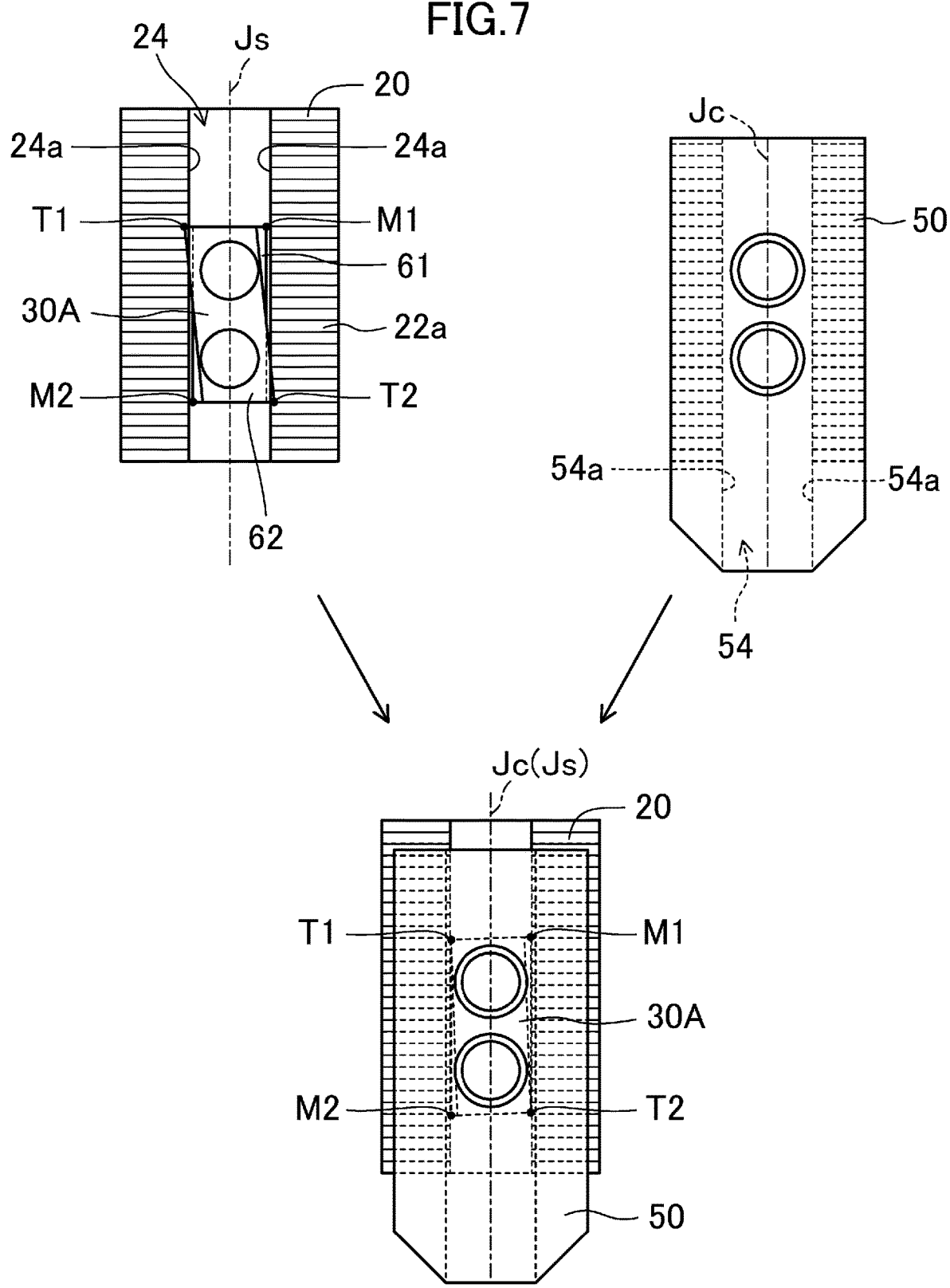
FIG. 7 is a view illustrating another embodiment of the positioning mechanism.

FIGS. 6 and 7 illustrate another embodiment of the positioning mechanism. The upper left illustration of FIG. 7 is a front view of the master jaw 20. The upper right illustration is a front view of the top jaw 50. The bottom illustration is a front view of the master jaw 20 with the top jaw 50 attached.

In this embodiment, the T-nut 30 (or a modified T-nut 30A) has a positioning mechanism. That is, as shown in FIG. 6, a key 30b of the modified T-nut 30A includes a first key 61 to be fitted into the first keyway 24 and a second key 62 to be fitted into the second keyway 54. The first and second keys 61 and 62 extend inclined with respect to each other (with inclinations extending in different directions).

In this case, the contact surface 53 and the contacted surface 22 come into close contact with each other and the top jaw 50 is parallel to the master jaw 20. Since the first and second keys 61 and 62 extend inclined with respect to each other, one pair of diagonally opposing corners T1 and T2 of the second key 62 comes into contact with the second inner contact surfaces 54a. The key 30b (i.e., the modified T-nut 30A) rotates so that the other pair of diagonally opposing corners M1 and M2 of the first key 61 comes closer to and into contact with the first inner contact surfaces 24a and is then twisted.

That is, in this case as well as in the positioning mechanism of the embodiment described above, the meshing between the serrations 22a and 53a inclines or twists the key 30b with respect to both the first and second keyways 24 and 54, thereby eliminating gaps. Accordingly, the positioning accuracy improves.

In this embodiment, only the T-nut 30 is to be modified, whereas conventional art may be used for the master jaw 20 and the top jaw 50. This embodiment is advantageous in its versatility.

Application Example of Modified T-Nut 30A

Figure 8:
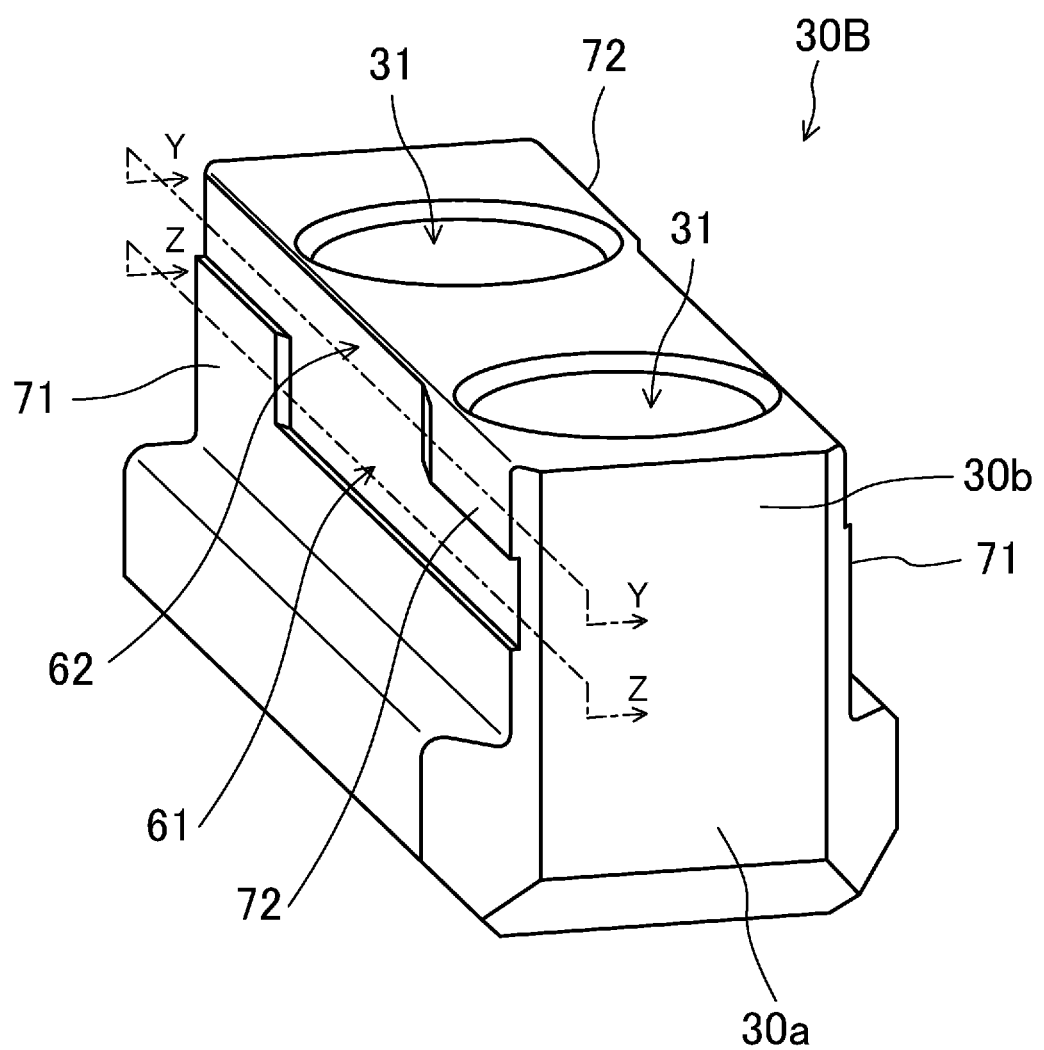
FIG. 8 is a schematic perspective view of a second modified T-nut.
Figure 9A:
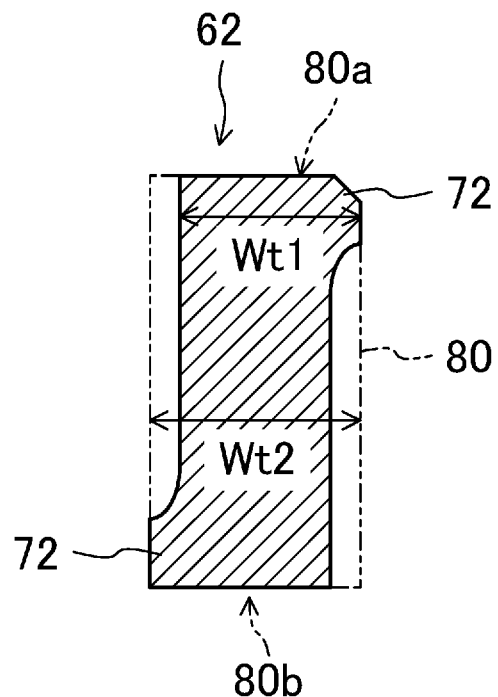
FIG. 9A is a schematic cross-sectional view taken along the arrow Y-Y of FIG. 8.
Figure 9B:
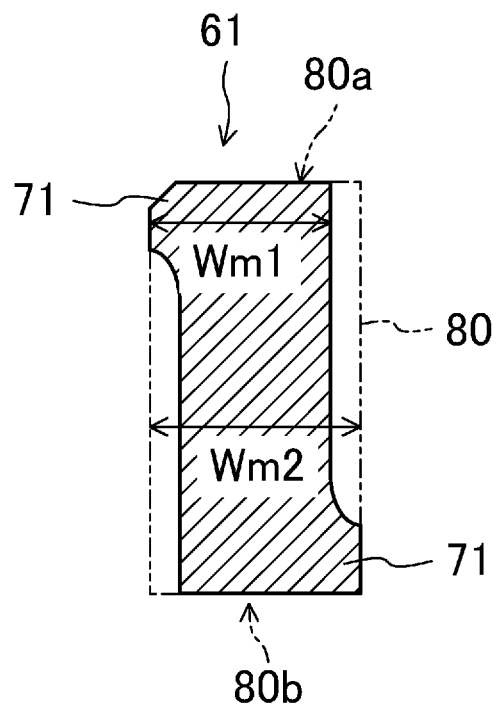
FIG. 9B is a schematic cross-sectional view taken along the arrow Z-Z of FIG. 8.
Figure 10:
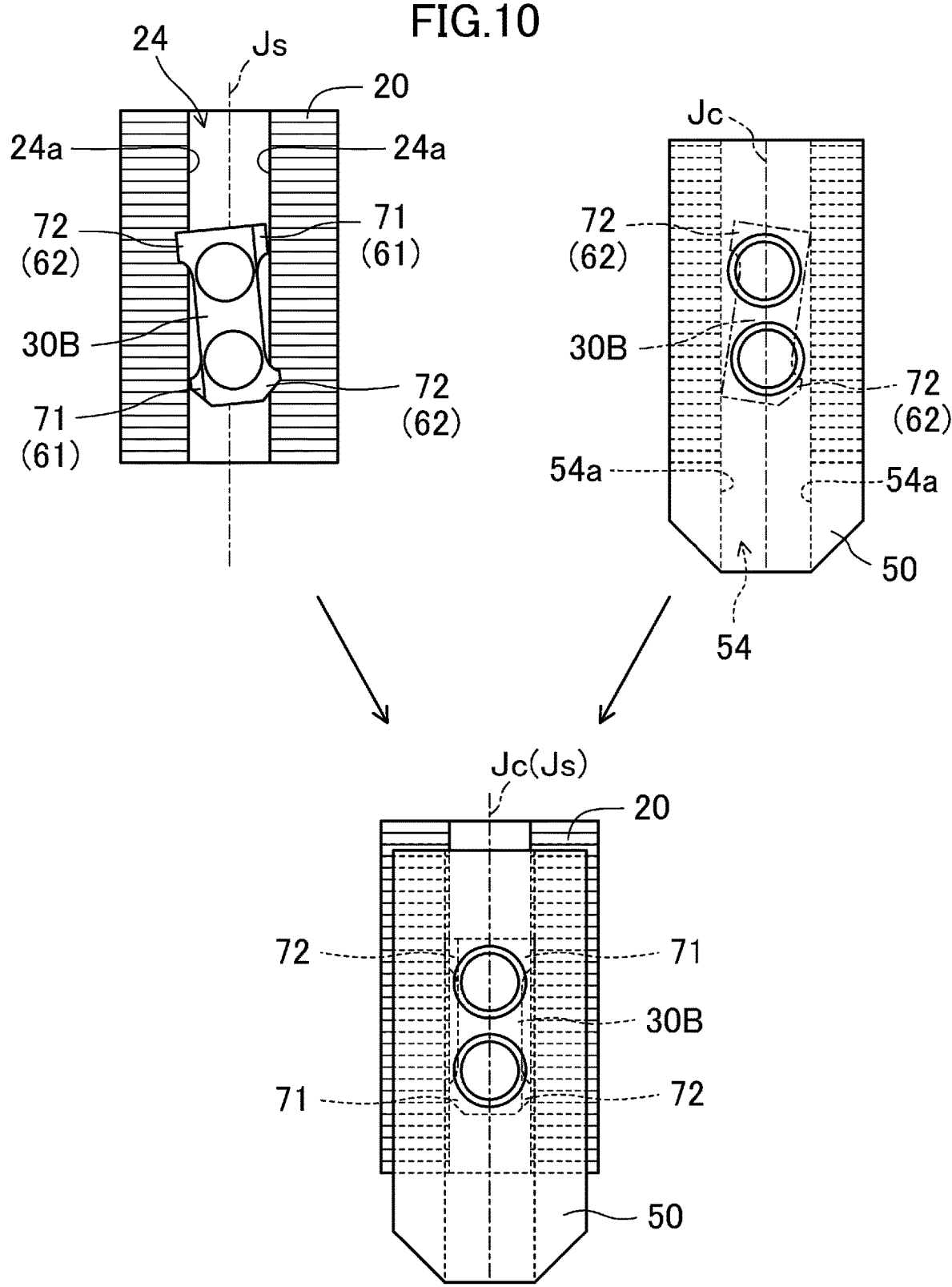
FIG. 10 is a view illustrating an application example of the modified T-nut (i.e., a second modified T-nut).

FIGS. 8 to 10 show an application example (a second modified T-nut 30B) of the modified T-nut 30A.

As shown in FIG. 8, a key 30b includes a first key 61 to be fitted into the first keyway 24 and a second key 62 to be fitted into the second keyway 54 as in the modified T-nut 30A. The first and second keys 61 and 62 of the second modified T-nut 30B have different shapes and sizes from those of the modified T-nut 30A.

The second modified T-nut 30B is formed by cutting a T-nut material including the key 30b (a wide key 80) wider than the first and second keyways 24 and 54. That is, as shown in FIG. 9B, with a part left at one longitudinal end (i.e., a second end 80a) of the wide key 80, one side (in the figure, the left) surface of the first key 61 is cut off with a constant thickness from the other longitudinal end (i.e., a first end 80b) (i.e., the first key has what is called a "relief"). The other side (in the figure, the right) surface of the wide key 80 is cut off similarly in the opposite direction.

Accordingly, the first key 61 has a pair of first protrusions 71 and 71 that transversely protrude from one pair of diagonally opposing corners of the first and second ends 80b and 80a.

As shown in FIG. 9A, opposite to the first key 61, with a part left at the first end 80b, one side (in the figure, the left) surface of the second key 62 is cut off with a constant thickness from the second end 80a. The other side surface of the wide key 80 is cut off similarly in the opposite direction. Accordingly, the second key 62 has a pair of second protrusions 72 and 72 protruding in the direction opposite to the first protrusions 71.

As a result, the width Wm1 of each end of the first key 61 including one of the first protrusions 71 is smaller than the first keyway 24. The maximum width Wm2 of the first key 61 including both the first protrusions 71 is larger than the first keyway 24. Similarly, the width Wt1 of each end of the second key 62 including one of the second protrusions 72 is smaller than the second keyway 54. The maximum width Wt2 of the second key 62 including both the second protrusions 72 is larger than the second keyway 54.

As a result, the first key 61 cannot be inserted without being inclined with respect to the first keyway 24, but can be easily inserted when being inclined. Similarly, the second key 62 can be easily inserted by being inclined with respect to the second keyway 54.

The upper left illustration of FIG. 10 is a front view of the master jaw 20 with the second modified T-nut 30B mounted. The upper right illustration is a front view of the top jaw 50. The bottom illustration is a front view of the master jaw 20 with the top jaw 50 attached.

In this case, like the modified T-nut 30A, the contact surface 53 and the contacted surface 22 come into close contact with each other and the top jaw 50 is parallel to the master jaw 20. Then, the second protrusions 72 come into contact with the second inner contact surfaces 54a. The key 30b (i.e., the second modified T-nut 30B) rotates so that the first protrusions 71 come into pressure contact with the first inner contact surfaces 24a and are twisted.

In this case as well, the meshing between the serrations 22a and 53a brings the key 30b into pressure contact with both the first and second keyways 24 and 54, thereby eliminating the gaps. Accordingly, the positioning accuracy improves. In addition to its versatility, the second modified T-nut 30B may be formed by easily processing an existing T-nut, for example. Thus, the second modified T-nut 30B is advantageous in its excellent productivity.

<Variations of Second Modified T-Nut 30B>

In the case of the second modified T-nut 30B, the pair of the second protrusions 72 and 72 in contact with the second inner contact surfaces 54a of the top jaw 50 protrude transversely from one pair of the diagonally opposing corners at both the longitudinal ends of the second key 62. The pair of the first protrusions 71 and 71 that are in contact with the first inner contact surfaces 24a of the master jaw 20 protrude transversely from both the longitudinal ends of the first key 61 in the direction opposite to the second protrusions 72 and 72.

That is, the first protrusions 71 and 71 and the second protrusions 72 and 72 are symmetrically arranged at the four corners of the second modified T-nut 30B. In this manner, the first and second protrusions 71 and 72 facing in the opposite directions at the both ends are close to each other. This allows firm positioning. In addition, the pair of the first and second protrusions 71 and 72 at the one end are longitudinally largely spaced apart from the pair of the first and second protrusions 71 and 72 at the other end. This provides a higher positioning accuracy.

However, the fastening force of the bolts 40 that fasten the top jaw 50 to the T-nut 30 is significantly strong. Front parts, that is, the parts (indicated by the two-dot chain lines in FIG. 3) at the contacted surface 22, of the base 21a of the master jaw 20 are likely to easily expand transversely through pressing by the T-nut 30.

On the other hand, in the case of the second modified T-nut 30B, the first protrusions 71 and 71 and the second protrusions 72 and 72 come into strong contact with the master jaw 20 in the greatly distant positions. This further results in easily causing expansion of the master jaw 20. In addition, the second modified T-nut 30B has a disadvantage of easily being affected by the orthogonal accuracy of the first and second keyways 24 and 54 orthogonal to the respective serrations 22a and 53a.

To overcome such the disadvantage, the second modified T-nut 30B has been further modified. The variations are shown in FIGS. 11A to 11G. In these variations, the first protrusions 71 and 71 and the second protrusions 72 and 72 are arranged differently from those of the second modified T-nut 30B.

Specifically, the first key 61 has, on its sides extending longitudinally, a pair of first protrusions 71 and 71 protruding from different longitudinal positions in opposite directions. The second key 62 has, on its sides extending longitudinally, a pair of second protrusions 72 and 72 protruding from different longitudinal positions in opposite directions.

In other respects such as the magnitude relations among the width Wm1 of the first key 61 including one of the first protrusions 71, the maximum width Wm2 of the first key 61 including both the first protrusions 71, the width Wt1 of the second key 62 including one of the second protrusions 72, and the maximum width Wt2 of the second key 62 including both the second protrusions 72 as well as how to insert the first and second keys 61 and 62 are the same as in the second modified T-nut 30B.

(First Variation)

Figure 11A:
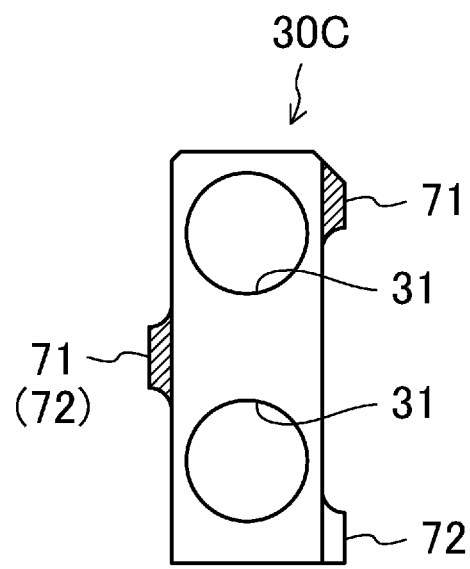
FIG. 11A is a schematic view illustrating a variation of the second modified T-nut.

FIG. 11A illustrates a first variation of the second modified T-nut 30B (i.e., a second modified T-nut 30C).

In the second modified T-nut 30C, one of the first protrusions 71 protrudes transversely from one longitudinal end of the second modified T-nut. The other first protrusion 71 protrudes transversely from a longitudinally intermediate part, specifically a substantial longitudinal center, of the second modified T-nut (the first protrusions 71 are slashed for ease of identification. The same applies hereafter). One of the second protrusions 72 located on the same side as the first protrusion 71 located at the end protrudes transversely from the other longitudinal end. The other second protrusion 72 is located in the same position as the other first protrusion 71 and protrudes transversely from the substantial longitudinal center.

With this arrangement of the first protrusions 71 and 71 and the second protrusions 72 and 72, the first protrusions 71 and 71 come into strong contact with the master jaw 20 in the close positions. This reduces the expansion of the master jaw 20. The second modified T-nut is less affected by the orthogonal accuracy of the first and second keyways 24 and 54.

This configuration further allows the second modified T-nut 30C to bend longitudinally. This elastic deformation acts as a buffer against force. As a result, dimensional errors in the first and second keyways 24 and 54 become tolerable, which decreases the reaction force to the forces acting on the first protrusions 71 and 71 and the second protrusions 72 and 72.

(Second Variation)

Figure 11B:
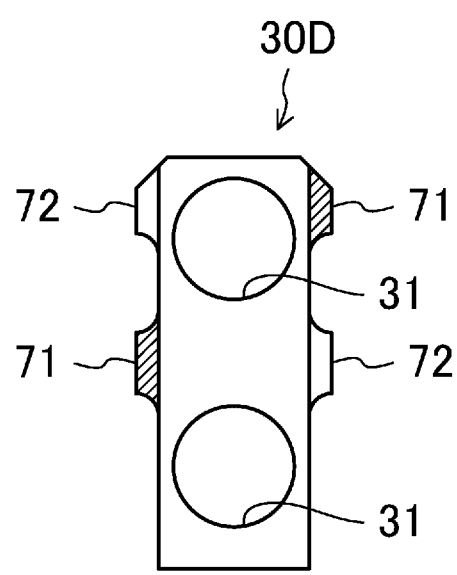
FIG. 11B is a schematic view illustrating another variation of the second modified T-nut.
Figure 11E:
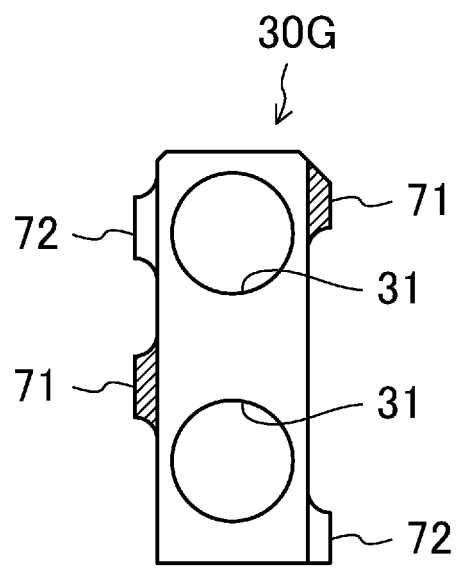
FIG. 11E is a schematic view illustrating a further variation of the second modified T-nut.

FIG. 11B illustrates a second variation of the second modified T-nut 30B (i.e., a second modified T-nut 30D). In the second modified T-nut 30D, the first protrusions 71 and 71 and the second protrusions 72 and 72 are arranged symmetrically unlike in the first variation.

Specifically, one of the first protrusions 71 protrudes transversely from one longitudinal end of the second modified T-nut. The other first protrusion 71 protrudes transversely from a longitudinally intermediate part, specifically a substantial longitudinal center, of the second modified T-nut. One of the second protrusions 72 is located at the end on the opposite side to the one first protrusion 71 located at the one end. The other second protrusion 72 is located at a substantial center on the opposite side to the other first protrusion 71 located at the substantial longitudinal center.

With this arrangement of the first protrusions 71 and 71 and the second protrusions 72 and 72, the first protrusions 71 and 71 come into strong contact with the master jaw 20 in the close positions. This reduces the expansion of the master jaw 20. The second modified T-nut is less affected by the orthogonal accuracy of the first and second keyways 24 and 54.

(Third Variation)

FIG. 11C illustrates a third variation of the second modified T-nut 30B (i.e., a second modified T-nut 30E). In this second modified T-nut 30E, the first protrusions 71 and 71 are arranged like in the first and second variations, whereas the second protrusions 72 and 72 are arranged like in the second modified T-nut 30B.

With this arrangement of the first protrusions 71 and 71 and the second protrusions 72 and 72, the first protrusions 71 and 71 come into strong contact with the master jaw 20 in the close positions. This reduces the expansion of the master jaw 20. In addition, the reaction force to the force acting on the top jaw 50 decreases.

(Fourth to Seventh Variations)

FIGS. 11D to 11G illustrate fourth to seventh variations of the second modified T-nut 30B (i.e., second modified T-nuts 30F to 30I). In these variations, the first protrusions 71 and 71 and the second protrusions 72 and 72 are arranged somehow differently from those of the second modified T-nut 30B and its variations described above.

For example, in the second modified T-nut 30F shown in FIG. 11D, the first and second protrusions 71 and 72 respectively located at a longitudinally intermediate part is shifted to each other at a substantial center, as compared to the second modified T-nut 30C shown in FIG. 11A. In the second modified T-nut 30G shown in FIG. 11E, the second protrusion 72 located on the side opposite to the first protrusion 71 located at the end is shifted in the direction from the end toward the center, as compared to the second modified T-nut 30E shown in FIG. 11C.

Figure 11F:
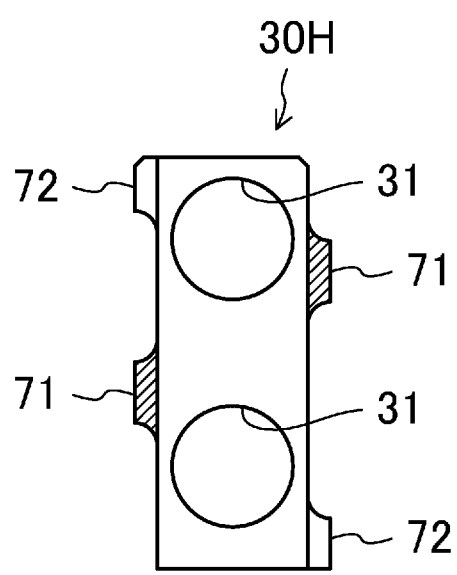
FIG. 11F is a schematic view illustrating a still further variation of the second modified T-nut.
Figure 11G:
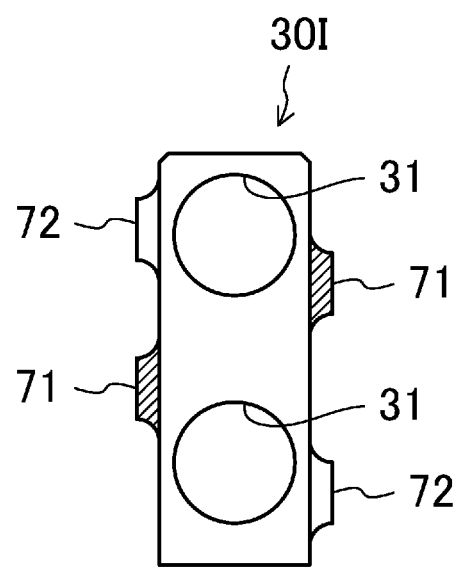
FIG. 11G is a schematic view illustrating a yet further variation of the second modified T-nut.

In the second modified T-nut 30H shown in FIG. 11F, the first protrusion 71 located on the side opposite to the second protrusion 72 located at the end is shifted in the direction from the end toward the center, as compared to the second modified T-nut 30E shown in FIG. 11C. In the second modified T-nut 30I shown in FIG. 11G, the first and second protrusions 71, 71 and 72, 72 are located near a longitudinal center, and the first protrusions 71, 71 are closer to the center than the second protrusions 72, 72 are, as compared to the second modified T-nut 30B.

In this manner, as apparent from the second modified T-nut 30B and its variations, the pair of first protrusions 71 and 71 protrude from different longitudinal positions in opposite directions on the respective ends of the first key 61 extending longitudinally (i.e., the respective ends of the longer sides of the first key 61). On the other hand, the pair of second protrusions 72 and 72 protrude from longitudinally different positions in opposite directions on the respective ends of the second key 62 extending longitudinally. This configuration makes it possible to maintain a high centering accuracy even after attaching/detaching the top jaw 50 after centering.

The arrangement of the first protrusions 71 and 71 and the second protrusions 72 and 72 at the four corners as in the second modified T-nut 30B makes it possible to achieve highly accurate positioning. Further, the arrangement of the first protrusions 71 and 71 and the second protrusions 72 and 72 as in the variations of the second modified T-nut 30B makes it possible to reduce the expansion of the master jaw 20.

The chuck according to the present invention is not limited to the above-described embodiments and includes other various configurations. For example, the key 30b is not necessarily in the shape of a rectangular parallelepiped.

In the second modified T-nut 30B and its variations, the maximum width of the first key 61 and the maximum width of the second key 62 may be the same or different from each other. Such the second modified T-nut 30B and its variations including keys with different maximum widths may be useful for different types of top jaws 50.

DESCRIPTION OF REFERENCE CHARACTERS

1 Chuck
1a Chuck Body
2 Jaw
3 Slide Groove
20 Master Jaw
22 Contacted Surface
22a Serrations
23 Support Groove
24 First Keyway
24a First Inner Contact Surface
25 Stopper Retainer
30 T-Nut (Connecting Member)
30a Stopper
30b Key
31 Fastening Hole
40 Bolt
50 Top Jaw
51 Workpiece Support
52 Bolt Insertion Hole
53 Contact Surface
53a Serrations
54 Second Keyway
54a Second Inner Contact Surface
61 First Key
62 Second Key
71 First Protrusion
72 Second Protrusion
Jr Rotation Axis
Js Slide Axis
Jz Jaw's Center Axis
Jc Support's Center Axis

The invention claimed is:

1. A chuck comprising: a plurality of jaws in front of a chuck body, the jaws sliding radially to support a workpiece so that a center of the workpiece agrees with a rotation axis, wherein each of the jaws includes:

a master jaw assembled to the chuck body and having, in front of the chuck body, a contacted surface with serrations extending circumferentially;

a connecting member being inserted into a support groove that is formed in the contacted surface to extend radially and being incapable of coming out along the rotation axis; and a top jaw having a contact surface with serrations, fastened to the connecting member along the rotation axis to come into close contact with the contacted surface, and being detachably attached to the master jaw to support the workpiece, the connecting member includes:

a stopper extending along the support groove; and a key extending, with a width smaller than that of the stopper, in accordance with the stopper;

the support groove includes:

a first keyway into which the key is fitted with a tip of the key protruding from the contacted surface; and a stopper retainer configured to hold the stopper, the top jaw includes, on the contact surface, a second keyway into which the tip of the key is fitted, a gap exists between the key and each of the first keyway and the second keyway, and a close contact between the contact surface and the contacted surface inclines or twists the key with respect to both the first keyway and the second keyway.

2. The chuck of claim 1, wherein the close contact between the contact surface and the contacted surface inclines or twists the key with respect to both the first keyway and the second keyway to come into contact with the first keyway and the second keyway.

3. The chuck of claim 2, wherein the top jaw is made of a soft material more easily deformable than the connecting member, and the close contact between the contact surface and the contacted surface twists and allows the key to bite into the second keyway.

4. The chuck of claim 3, wherein the key includes:

a first key to be fitted into the first keyway; and a second key to be into the second keyway, and the first key and the second key extend inclined with respect to each other.

5. The chuck of claim 3, wherein the key includes:

a first key to be fitted into the first keyway; and a second key to be into the second keyway, and the first key has, on its sides extending longitudinally, a pair of first protrusions protruding from different longitudinal positions in opposite directions, the second key has, on its sides extending longitudinally, a pair of second protrusions protruding from different longitudinal positions in opposite directions, a width of the first key including one of the first protrusions is smaller than the first keyway, and a maximum width of the first key including both the first protrusions is larger than the first keyway, and a width of the second key including one of the second protrusions is smaller than the second keyway, and a maximum width of the second key including both the second protrusions is larger than the second keyway.

6. The chuck of claim 5, wherein each of the pair of the second protrusions protrudes transversely from one pair of diagonally opposing corners at both the longitudinal ends of the second key.

7. The chuck of claim 5, wherein one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

8. The chuck of claim 2, wherein at least one of the first keyway and the second keyway extends inclined with respect to the associated serrations.

9. The chuck of claim 2, wherein the key includes:

a first key to be fitted into the first keyway; and a second key to be into the second keyway, and the first key and the second key extend inclined with respect to each other.

10. The chuck of claim 2, wherein the key includes:

a first key to be fitted into the first keyway; and a second key to be into the second keyway, and the first key has, on its sides extending longitudinally, a pair of first protrusions protruding from different longitudinal positions in opposite directions, the second key has, on its sides extending longitudinally, a pair of second protrusions protruding from different longitudinal positions in opposite directions, a width of the first key including one of the first protrusions is smaller than the first keyway, and a maximum width of the first key including both the first protrusions is larger than the first keyway, and a width of the second key including one of the second protrusions is smaller than the second keyway, and a maximum width of the second key including both the second protrusions is larger than the second keyway.

11. The chuck of claim 10, wherein each of the pair of the second protrusions protrudes transversely from one pair of diagonally opposing corners at both the longitudinal ends of the second key.

12. The chuck of claim 11, wherein one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

13. The chuck of claim 10, wherein one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

14. The chuck of claim 1, wherein at least one of the first keyway and the second keyway extends inclined with respect to the associated serrations.

15. The chuck of claim 1, wherein the key includes:

a first key to be fitted into the first keyway; and a second key to be into the second keyway, and the first key and the second key extend inclined with respect to each other.

16. The chuck of claim 1, wherein
the key includes:
a first key to be fitted into the first keyway; and
a second key to be into the second keyway, and
the first key has, on its sides extending longitudinally, a pair of first protrusions protruding from different longitudinal positions in opposite directions,
the second key has, on its sides extending longitudinally, a pair of second protrusions protruding from different longitudinal positions in opposite directions,
a width of the first key including one of the first protrusions is smaller than the first keyway, and a maximum width of the first key including both the first protrusions is larger than the first keyway, and
a width of the second key including one of the second protrusions is smaller than the second keyway, and a maximum width of the second key including both the second protrusions is larger than the second keyway.

17. The chuck of claim 16, wherein
each of the pair of the second protrusions protrudes transversely from one pair of diagonally opposing corners at both the longitudinal ends of the second key.

18. The chuck of claim 17, wherein
each of the pair of the first protrusions protrudes from one longitudinal end of the first key in a direction opposite to corresponding one of the second protrusions.

19. The chuck of claim 17, wherein
one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

20. The chuck of claim 16, wherein
one of the first protrusions protrudes transversely from one longitudinal end of the first key, the other of the first protrusions protrudes transversely from a longitudinally intermediate part of the first key, one of the second protrusions protrudes transversely from one longitudinal end of the second key, and the other of the second protrusions protrudes transversely from a longitudinally intermediate part of the second key.

* * * * *